United States Patent [19]

Oshima et al.

[11] Patent Number: 5,550,198

[45] Date of Patent: Aug. 27, 1996

[54] POLYURETHANE RESIN COMPOSITION

[75] Inventors: Toshiyuki Oshima, Ibaraki; Hideo Ishibashi, Neyagawa; Hiromasa Minamino, Yao; Satoshi Yamamoto, Hirakata; Takaharu Izumo, Shimamotocho; Mitsuharu Kaneko, Hiroshima, all of Japan

[73] Assignee: Nippon Paint Co., Ltd., Osaka, Japan

[21] Appl. No.: 356,540

[22] Filed: Dec. 15, 1994

Related U.S. Application Data

[62] Division of Ser. No. 190,505, Feb. 2, 1994, abandoned.

[30] Foreign Application Priority Data

Feb. 2, 1993 [JP] Japan ................................. 5-37519
Sep. 22, 1993 [JP] Japan ................................ 5-259365

[51] Int. Cl.$^6$ ............................. C08L 75/02; C08G 18/50
[52] U.S. Cl. ........................ 525/404; 525/123; 525/131
[58] Field of Search ................................. 525/123, 131, 525/404

[56] References Cited

U.S. PATENT DOCUMENTS 4,098,772  7/1978  Bonk et al. .......................... 528/49
5,331,051  7/1994  Ishibashi et al. ..................... 525/131

*Primary Examiner*—W. Robinson H. Clark
*Attorney, Agent, or Firm*—Millen, White, Zelano & Branigan, P.C.

[57] ABSTRACT

A polyurea resin composition for RIM or coating use Comprises (a) a polyoxyalkylenepolyamine, (b) an aromatic polyamine and/or a xylylenediamine and (c) a polyisocyanate compound with either one or both of components (a) and (b) having been modified by a Michael reaction with a vinyl monomer having an electron attracting group to convert the primary amino group thereof to a secondary amino group. The composition also contains as an internal mold release a polyoxyalkylene glycol mono-$C_4$–$C_1$, alkyl ether and/or as a polyamine component a reaction product between a primary aromatic polyamine and a polyglycidyl ether.

13 Claims, No Drawings

POLYURETHANE RESIN COMPOSITION

This is a division of the application Ser. No. 08/190,505 filed Feb. 2, 1994 now abandoned.

FIELD OF THE INVENTION

This invention relates to a polyurea resin composition for reaction injection molding (hereinafter referred to briefly as RIM) or coating use.

BACKGROUND OF THE INVENTION

Recent years have witnessed a mounting interest in the RIM technology, that is a technology by which an automative bumper, for instance, is manufactured by simultaneous polyurethane-forming reaction and molding of the resulting resin in a mold, and several versions of such technology have been disclosed in, inter alia, U.S. Pat. Nos. 4,254,069, 3,838,076, 4,216,543, 4,246,363 and 4,269,945.

However, the technology of reacting a polyalkylenepolyol with a polyisocyanate in a mold cavity to give a polyurethane molding in situ not only encountered various difficulties due to the relatively poor heat resistance and coatability of the polyurethane but entailed a high production cost. For this reason, attention was paid to polyurea resins which are more heat-resistant and there has been proposed a technology for producing polyurea moldings which are superior to polyurethane moldings in mechanical strength, heat resistance and other physical properties. This technique comprises reacting an amine-terminated polyoxyalkylenepolyamine having an average molecular weight of at least 1500 with an amine terminal chain extender and a polyisocyanate in a closed mold. A method in this category is disclosed in Japanese Patent Application Laid-Open No. 1818643/83.

However, since a polyoxyalkylenepolyamine is more reactive to an isocyanate component than a polyether polyol, the cure reaction proceeds so fast that, unless mold charging is completed within, say, one second by the use of a machine dedicated solely to the polyurea RIM, no satisfactory molding can be obtained.

The reactivity of polyoxyalkylenepolyamine to a polyisocyanate may be decreased by converting its terminal amino groups from an aliphatic to aromatic nature. Thus, Japanese Patent Application Laid-open No. 273016/91 proposed to use an aromatic polyoxyalkylenepolyamine produced by the reaction of a polyoxyalkylenediepoxide with an aromatic amine. Alternatively, the reactivity of a polyoxyalkylenepolyamine may be decreased by converting its terminal amino groups from a primary to secondary amino group as taught in Japanese Patent Application Laid-open No. 311116/89 and No. 41310/90. U.S. Pat. No. 5,192,814 assigned to the assignee of this application discloses a polyurea RIM composition comprising a secondary polyamine produced by the Michael reaction of a primary polyamine with an unsaturated monomer. However, the known methods are not fully satisfactory in terms of initial stength characteristics of the resulting molding. Because of this, the molding often tends to be deformed or a piece thereof is torn off and remains within the interstices of the mold when the molding is ejected.

Since the length of time required for each molding cycle should be as short as possible for the polyurethane/polyurea RIM, an easy mold release operation is an important factor for performing a high productivity in the RIM. Usually this is accomplished by applying a mold release onto the inner surfaces of mold cavity. It is also known to incorporate an internal mold release into the resin material of RIM. By so doing, the application of an external mold release may be dispensed with or rendered persistent with a number of repeated molding cycles. See, Japanese Patent Application Laid-open No. 500418/85, No. 83215/86 and No. 88845/81. Typically, the internal mold release used therein is a higher fatty acid, a metal salt or amide thereof. However, the known internal mold release has certain defects in that it is not so effective in the polyurea RIM as in the polyurethane RIM and more importantly that the coatability of the resulting polyurea moldings is greatly impaired. Consequently, the molding requires a pre-treating step such as rinsing with trichloroethane before subjecting to a coating process in order to retain a good adherance to the coating film.

A need exists, therefore, for a polyurea resin composition which may ameliorate or eliminate the above defects.

SUMMARY OF THE INVENTION

The present invention provides a polyurea resin composition having improved in-mold flow and initial strength characteristics as well as an improved self-mold releaseability compatible with coatability.

To this end, the present invention provides a polyurea resin composition comprising:

(a) a polyoxyalkylenepolyamine;

(b) an aromatic polyamine and/or a xylylenediamine;

at least one of said polyoxyalkylenepolyamine (a) and said aromatic polyamine and/or a xylylenediamine (b) having been modified either wholly or partly to have a plurality of secondary amino groups by a Michael reaction of the primary amino group thereof with an unsaturated compound of the formula $CH_2=C(R)-Y$, wherein R is a hydrogen atom or a methyl and Y is an electron attracting group;

(c) a polyoxyalkylene glycol mono- $C_4$–$C_{18}$, alkyl ether having an average molecular weight from 800 to 10,000 and/or a reaction product of a polyglycidyl ether and an primary aromatic polyamine; and (d) a polyisocyanate compound.

DETAILED DESCRIPTION OF THE PREFERRED EMBODIMENTS

Michael reaction

In this invention, the above-mentioned modified polyamine or polyamines are used for either one or both of (a) polyoxyalkylenepolyamine and (b) chain extender aromatic polyamine and/or xylenediamine in a polyurea resin composition. Such modified polyamine can be easily synthesized at a relatively high conversion rate by subjecting the corresponding primary polyamine and a vinyl monomer of the formula $CH_2=C(R)-Y$ to Michael reaction using or without using a catalyst. The reaction mixture thus obtained can be directly put to use without purification. The use of such a modified polyoxyalkylenepolyamine and/or chain extender polyamine provides a RIM polyurea resin composition with markedly improved in-mold flow and green strength characteristics.

The polyoxyalkylenepolyamine having terminal primary amino groups for use as a starting compound in this invention can be provided by converting a polyoxyalkylenepolyol having a plurality of terminal primary alcoholic hydroxyl groups to the corresponding polyoxyalkylenepolyamine having a plurality of terminal primary amino groups. This may be done by reacting the polyoxyalkylenepolyol with ammonia in the presence of a catalyst such as nickel, ruthenium or copper to directly convert the hydroxyl group to the primary amino group as taught in Japanese Patent Application Laid-open Nos. 204225/86, 278528/86, 38425/90 and 127425/90. Alternatively, the polyoxyalkylenepolyamine may be produced by the two step reaction of firstly cyanoethylating the polyoxyalkylenepolyol with acrylonitrile and then hydrogenating the cyanoethyl group to aminopropyl group as taught in U.S. Pat. No. 3,496,138.

The polyoxyalkylenepolyol mentioned above can be obtained by subjecting an alkylene oxide to ring-opening polymerization using a basic catalyst, such as an alkali metal hydroxide, in the presence of an appropriate initiator. The initiator includes, inter alia, ethylene glycol, diethylene glycol, triethylene glycol and other polyethylene glycols, propylene glycol, dipropylene glycol, tripropylene glycol and other polypropylene glycols, glycerol, diglycerol, pentaerythritol, sorbitol, sucrose and other polyhydric alcohols, bisphenol A, bisphenol S, resol and other polyphenols, and various amines such as diethanolamine, triethanolamine and so on. As regards the alkylene oxide mentioned above, ethylene oxide, propylene oxide, butylene oxide, tetrahydrofuran, etc. can be used independently or in an optional combination.

Many polyoxyalkylenepolyamines are commercially available. For example, Jeffamine D-2000 (Texaco Chemical, amine equivalent ca. 1000) is a polyoxypropylenediamine and Texrim TR-5050 (ditto, amine equivalent ca. 1900) and Jeffamine T-403 (ditto, amine equivalent ca. 160) are polyoxypropylenetriamines. All of such commercial polyoxyalkylenepolyamines can be used with advantage in this invention.

The primary aromatic polyamine for use as a starting compound in accordance with this invention includes, inter alia., 2,4-diaminotoluene, 2,6-diaminotoluene, 1-methyl 3,5-diethyl-2,4-diaminobenzene, 1-methyl-3,5-diethyl-2,6diaminobenzene (the latter two are also known as diethyltoluenediamine or DETDA), 1,3,5-triethyl-2,6diaminobenzene, 4,4'-diaminodiphenylmethane,3,5,3', 5'-tetraethyl-4,4'-diaminodiphenylmethane,3,5-diethylthio-2,4-toluenediamine and so on. The preferred aromatic polyamines are 2,4-diaminotoluene, 2,6-diaminotoluene, 1-methyl-3,5-diethyl- 2,6-diaminobenzene, 1-methyl-3,5-diethyl-2,4-diaminobenzene and 4,4'-diaminodiphenylmethane, inclusive of mixtures of such polyamines.

Many such aromatic polyamines are commercially available. Thus, for example, Ethacure 100 (Ethyl Corporation) is a mixture of 1-methyl-3,5-diethyl-2,4-diaminobenzene and 1-methyl-3,5-diethyl-2,6-diaminobenzene. Tolylenediamine (Mitsui Toatsu Chemicals) is 2,4-diaminotoluene and MDA-220 (Mitsui Toatsu Chemicals) is 4,4'-diaminodiphenylmethane.

While xylylenediamine may occur as 1,2-1,3- and 1,4-isomers, any of these isomers and any mixture of them are within the scope of this invention.

The xylylenediamine for use in this invention can be prepared by hydrogenating the corresponding dinitrile in the presence of a nickel or cobalt catalyst. Such a xylylenediamine is commercially available under the tradename of Showamine X (Showa Denko).

The mating compound, namely an unsaturated compound of the formula $CH_2=C(R)-Y$ (wherein R means a hydrogen atom or methyl group; Y means an electron attracting group such as a carboxylic acid residue, ketone residue, a cyano group, an unsubstituted or substituted amide residue, sulfone residue, sulfonic ester residue or the like), includes, inter alia, acrylic esters (e.g. n-butyl acrylate, i-butyl acrylate, t-butyl acrylate, 2-ethylhexyl acrylate, methyl acrylate, lauryl acrylate, stearyl acrylate, propyl acrylate, 2-hydroxyethyl acrylate, 2-hydroxypropyl acrylate, etc.), methacrylic esters (e.g. n-butyl methacrylate, i-butyl methacrylate, t-butyl methacrylate, 2-ethylhexyl methacrylate, methyl methacrylate, lauryl methacrylate, stearyl methacrylate, propyl methacrylate, 2-hydroxyethyl methacrylate, 2-hydroxypropyl methacrylate, etc.), acrylonitrile, acrylamide, N,N-dimethylacrylamide, methyl vinyl ketone, ethyl vinyl ketone, methyl vinyl sulfone, ethyl vinyl sulfone, methyl vinylsulfonate, ethyl vinylsulfonate and so on. All of these compounds can be advantageously used in this invention.

When an unsaturated compound of the formula $CH_2=C(R)-Y$ wherein R is a hydrogen atom is used in the Michael reaction with a polyoxyalkylenepolyamine, the reaction is preferably conducted in the presence of a low molecular weight aromatic compound having at least one electron donating or electron attracting group, other than hydrogen, as a substituent.

As examples of such aromatic compounds having at least one electron donating or electron attracting group, other than hydrogen, as a substituent on the aromatic ring, there may be mentioned hydrocarbon substituted compounds (toluene, xylene, ethylbenzene, t-butylbenzene, diphenylmethane, etc.), amino-substituted compounds (aniline, N,N-dimethylaniline, tolylenediamine, xylidine, diaminodiphenylmethane, diethyltolylenediamine, aminonaphthalene, etc.), alcohol-substituted compounds (phenol, cresol, naphthol, etc.), halogen-substituted compounds (fluorobenzene, chlorobenzene, bromobenzene, iodobenzene, fluoronaphthalene, chloronaphthalene, bromonaphthalene, iodonaphthalene, etc.), nitro-substituted compounds (nitrobenzene, dinitrotoluene, dinitronaphthalene, etc.), cyano-substitued compounds (benzonitrile, naphtonitrile, etc.), ketone-substituted compounds (acetophenone, propiophenone, etc.), quinones (benzoquinone, naphthoquinone, etc.), and compounds having two or more different such substituents in combination. These compounds are used where necessary and have been demonstrated to be effective in enhancing the yield of Michael reaction.

Such low molecular weight aromatic compound having at least one electron donating or electron attracting group, other than hydrogen, as a nuclear substituent is used with advantage in the modification reaction of a polyoxyalkylenepolyamine. It has been found that the addition of such a compound even at a low level contributes to the conversion rate in the Michael reaction. The compound is generally used in a proportion of not more than 100 mole % based on the amino function.

The Michael reaction in this invention may often be accelerated when use is made of a neutral or acid catalyst which is generally used in esterification.

Among esterification catalysts which can be used for this purpose include many of the common acids (hydrochloric acid, sulfuric acid, nitric acid, phosphoric acid, propionic acid, formic acid, acetic acid, dichloroacetic acid, trichloroacetic acid, trifluoroacetic acid, benzoic acid, p-toluenesulfonic acid, etc.) and, as solid acids, metal oxides (aluminum oxide, silicon oxide, niobium oxide, etc.), composite metal oxides ($SiO_2$—$Al_2O_3$, $TiO_2$—$SiO_2$, $SiO_2$—$La_2O_3$, $TiO_2$—$Al_2O_3$, etc.), sulfides (zinc sulfide etc.), metal sulfates (nickel sulfate, copper sulfate, etc.), metal phosphates (aluminum phosphate, titanium phosphate, etc.), chlorides (aluminum chloride, copper chloride, etc.), clay minerals (acid clay, montmorillonite, kaolin, etc.), immobilized acids (immobilized phophoric acid, immobilized sulfuric acid, immobilized boric acid, etc.), resins (ion exchange resins, etc.), zeolite and so on. Furthermore, organometal compounds may also be employed. Thus, there may be mentioned organotin compounds (dibutyltin oxide, dibytyltin dilaurate, etc.), organoaluminum compounds including trialkoxides, chelates and acylates (aluminum isopropylate, mono-sec-butoxyaluminum diisoporpylate, aluminum ethylate, aluminum ethylacetoacetate diisopropylate, aluminum-tris(ethylacetoacetate), aluminum-tris(acetylacetonate), aluminum-bis-ethylacetoacetate monoacetylacetonate, etc.), organotitanium compounds including tetralkoxides, chelates, acylates (tetraisoproxytitanium, tetra-n-butoxytitanium, tetrakis-2-ethylhexoxytitanium, tetrakis(stearyloxy)titanium, diisopropoxy-bis(acetylacetonato)titanium, isopropoxy(2-ethylhexanediolato)titanium, di-n-butoxy-bis-(triethanolamin ato)titanium, hydroxy-bis(lactato)titanium, etc.) and so on. These compounds can also be used with advantage in the present invention.

The primary polyoxyalkylenepolyamine, aromatic polyamine and xylylenediamine may be independently subjected to Michael reaction and the respective reaction products be admixed. Alternatively, they may be admixed all in the primary amine form and subjected to Michael reaction concurrently or selectively. In either case, the primary polyamine is reacted with said unsaturated compound in an amino functionality/unsaturation ratio of 1:0.01 to 1:100, preferably 1:1 to 1:10. Therefore, the resulting modified polyamine may contain the unreacted primary polyamine and the excess of the unsaturated compound. The esterification catalyst is used generally in a proportion of not more than 0.1 mole % relative to the amino group.

The conditions of this reaction depend on the kind and amount of the esterification catalyst. Generally speaking, however, the reaction is generally conducted at a temperature between room temperature and about 150° C.

After completion of the reaction, the reaction mixture need not be after-treated. Where necessary, however, the residual unsaturated compound may be removed by distillation under reduced pressure, a suitable polymerization initiator may be added for polymerization, or the reaction mixture may be treated to remove the acid.

Polyoxyalkylene glycol monoalkyl ether

This component is used as a reactive internal mold release. As is well-known, polyoxyalkylene glycol monoalkyl ethers are produced by the addition-polymerization reaction of an alkylene oxide to a monohydric alkanol initiator in the presence of an alkaline catalyst. The initiator used in the present invention includes a $C_4$–$C_{18}$ alkanol such as n-butanol, hexanol, 2-ethylhexanol, n-octyl alcohol, decyl alcohol, lauryl alcohol, myristyl alcohol, stearyl alcohol and a mixture of these alkanols. As regards the alkylene oxide mentioned above, ethylene oxide and propylene oxide are conventionally used alone or in combination. Particularly advantageous are those including both ethylene oxide and propylene oxide units in a random or block copolymer form containing at least 10 mole %, most preferably from 30 to 80 mole % of the ethylene oxide units in the polyoxyalkylene chain. The average molecular weight of the polyoxyalkylene glycol monoalkyl ether preferably ranges between 800 and 10,000, more preferably between 1,000 and 6,000.

Reaction product of polyglycidyl ether and primary aromatic polyamine

The ring-opening reaction of glycidyl group with an amine is well-known in the chemistry of epoxy resins. In the present invention, a reaction product produced from a primary aromatic polyamine and a polyglycidyl ether by the above reaction may be incorporated into the polyurea resin composition of the present invention. However, the molar ratio of amino group to epoxy group must be at least 2. The starting primary aromatic polyamines are as described above with respect to Michael reaction.

The term "polyglycidyl ether" as used herein refers to a glycidyl ether of a polyhydroxy compound and includes polyphenol polyglycidyl ethers such as bisphenol epoxy resins, polyetherpolyol polyglycidyl ethers such as polyglycerine polyglycidyl ethers, polyoxyalkylenepolyol polyglycidyl ethers and the like. The average molecular weight of polyglycidyl compound is preferably less than that of another polyamine component having the greatest average molecular weight and generally ranges between 200 and 10,000, preferably between 270 and 800. Many such polyglycidyl ethers are commercially available including DENACOL EX 2000 (Nagase Kasei Kogyo, epoxy equivalent 1,100), DENACOL EX 931 (ditto, epoxy equivalent 528), DENACOL EX 421 (ditto, epoxy equivalent 155), EPOLITE 400P (Kyoeisha Oil and Fats Chemicals, epoxy equivalent 320–360) and SR-TPG (Sakamoto Yakuhin Kogyo, epoxy equivalent 200). All of such commercial products can be used with advantage in this invention.

Both reactants may be directly reacted at an amino to epoxy molar ratio equal to or greater than 2. Thus, the presence of unreacted primary aromatic amine may be tolerated. Alternatively, the above reaction may be performed in the modified polyamine as discussed above containing a secondary polyamine produced by the Michael reaction of the corresponding primary polyamine with an unsaturated vinyl monomer. In this case, the polyglycidyl ether reactant will preferentially react with the primary aromatic polyamine reactant and thus the reaction mixture will contain no or only a trace amount of the reaction product of the secondary polyamine. Again, the presence of unreacted primary aromatic polyamine in the reaction mixture may be tolerated.

The reaction may generally be performed by heating the reactants at a temperature from room temperature to 150° C., preferably from 70° C. to 120° C. in the absence of a catalyst.

Polyisocyanates

A variety of polyisocyanates can be employed for the purposes of the invention. Among typical aromatic polyisocyanates are carbodiimide-type liquid diphenylmethane diisocyanate or diphenylmethane diisocyanate partial prepolymer, 2,4-tolylene diisocyanate, 2,6-tolylene diisocyanate, diphenylmethane-4,4'-diisocyanate, xylylene diisocyanate, crude tolylene diisocyanate, polymethylenepolyphenyl polyisocyanates, etc. and these polyisocyanates may be in the form of carbodiimides or buirets. A particularly preferred aromatic polyisocyanate is pure methylenebis(4-phenyl isocyanate) (hereinafter referred to MDI) or a prepolymer or modification product thereof.

These compounds can be used for the production of satisfactory RIM moldings. Pure MDI is a solid and, therefore, is often found to be inconvenient in use. Accordingly, liquid preparations based thereon are frequently used and such preparations are subsumed in the concept of MDI, that is methylenebis(4-phenyl isocyanate). U.S. Pat. No. 3,394, 164 discloses examples of liquid MDI. Moreover, uretonimine-modified MDI is also included in the above definition. As commercial products of this type, Millionate MTL and Millionate MTL-C are available from Nippon Polyurethane Industry Co., Ltd.

The aliphatic or alicyclic polyisocyanate for use in this invention includes, inter alia, dicyclohexylmethane4,4'-diisocyanate, isophorone diisocyanate, hexamethylene diisocyanate, hydrogenated xylylene diisocyanate, etc. and the corresponding isocyanurates and carbodiimides. The more beneficial aliphatic or alicyclic polyisocyanate is hexamethylene diisocyanate (HMDI) or an HMDI prepolymer. As commercial products of this type, there may be mentioned Coronate HX and Coronate HK from Nippon polyurethane Industry Co., Ltd. and Sumidur N3200 from Sumitomo Bayer Urethane Co., Ltd.

Polyurea resin composition

A polyurea RIM composition comprising as a polyamine component a modified polyamine produced by the Michael reaction of a primary polyoxyalkylenepolyamine, a primary aromatic polyamine and/or xylylenediamine, is disclosed in U.S. Pat. No. 5,192,814 assigned to the assignee of this application. The entire disclosure of which is incorporated herein by reference. This composition is less susceptible to premature curing reaction and has a satisfactory flowability time compared with the conventional polyurea composition based on the corresponding primary polyamines while retaining improved initial strength characteristics.

In addition, the polyurea resin composition of the present invention exhibits an improved mold releaseability without compromising the coatability of the resulting moldings when polyoxyalkylene glycol monoalkyl ether is incorporated. When the reaction product between a primary aromatic polyamine and a polyglycidyl ether is incorporated, the polyurea resin composition exhibits further improvement in initial strength properties in terms of rigidity and toughness.

As taught in the above-cited patent, the ratio of the average amine equivalent of the sum of all polyamine components to the average NCO equivalent of the polyisocyanate component is from 1:0.7 to 1:1.5, preferably from 1:0.95 to 1:1.25, and more preferably from 1:1.01 to 1:1.10, and the secondary polyamine content of the polyamine contents is not less than 5.0 weight percent. The reaction product between a primary aromatic polyamine and a polyglycidyl ether is regarded as a primary polyamine in the above calculation and accounts for from 2 to 40%, preferably from 5 to 20% by weight based on the entire composition.

The polyoxyalkylene monoalkyl ether component is incorporated in an amount of less than 5%, preferably from 0.5 to 2% by weight based on the-entire composition. Excessive addition thereof will adversely affect the mechanical-strength and coatability of the moldings and, therefore, should be avoided.

Although the polyurea composition of the present invention is disclosed mainly by making reference to RIM use, the composition finds use as a coating composition in which the polyamine component and the polyisocyanate component are kept separately and admixed together immediately prior to the application onto a substrate.

Where necessary, in using the composition of the invention for reaction injection molding, there may be incorporated a variety of additives such as surfactants, blowing agents, foam stabilizers, flame retardants, plasticizers, fillers, fungicides, bactericides, reinforcing materials, antioxidants, weatherability agents and so on in appropriate proportions.

The following examples and comparative examples are intended to illustrate the present invention in further detail and should by no means be construed as defining the metes and bounds of the invention. In the examples, all parts and percents (%) are by weight.

Production Example 1

| Formulation | |
| --- | --- |
| N-Butanol | 148 parts (2 moles) |
| Water | 30 parts (2 moles) |
| KOH | 2.22 parts (2 moles) |
| Ethylene oxide | 1716 parts (39 moles) |
| Propylene oxide | 1740 parts (30 moles) |

An autoclave was charged with 148 parts of n-butanol, 30 parts of water and 2.22 parts of potassium hydroxide, purged with nitrogen gas and maintained the inner pressure at 3 atm under stirring. Then, the inner temperature was raised to 50° C. and 176 parts of ethylene oxide previously liquidized in a separate container at 5 atm were added dropwise over 20 minutes to the autoclave while maintaining the maximum inner temperature and pressure at 50° C. and 6 atm, respectively. After the addition, stirring was continued while maintaining the inner temperature at 50°–56° C. until the inner pressure reached at a constant pressure of 3.2 atm. Whereupon water was removed from the reaction mixture using a vacuum pump and then the inner temperature was raised to 93° C. with stirring. Then a half of a mixture of 1540 parts of ethylene oxide and 1740 parts of propylene oxide previously liquidized in a separate container at 5 atm was added dropwise to the autoclave over 4 hours and the remaining ethylene oxide/propylene oxide was added dropwise over 5 hours while maintaining the maximum inner temperature and pressure at 110° C. and 6 atm, respectively. After the addition, stirring was continued until the inner pressure reach at a constant pressure of 3.5 atm whereupon the reaction was terminated. After the reaction, the reaction mixture was cooled to a temperature lower than 20° C., neutralized with an ion exchange resin and then evaporated at 80°–90° C. to remove water and other low molecular weight impurities. The product was further purified by the azeotropic distillation with toluene at 120° C. at 10 mmHg. A polyoxyalkylene glycol monobutyl ether having a weight average molecular weight of 1700, a hydroxyly number of 32 and a viscosity of 290 cps at 25° C. was obtained as a colorless transparent liquid. This compound is hereinafter referred to as "nBuEOPO".

Production Example 2

Texrim TR-5050 (trifunctional, amine equivalent 1930, average molecular weight 5000), 2-ethylhexyl acrylate and diaminodiphenylmethane were reacted in an equivalent ratio of 1:2:1: at 120° C. for 40 hours to give a modified polyamine A. Rate of conversion to secondary amino=86%.

Production Example 3

Jeffamine T-403 (trifunctional, amine equivalent 160, average molecular weight 400) and 2-ethylhexyl acrylate were reacted in an equivalent ratio of 1:1 for 5 hours to give a modified polyamine B. Rate of conversion to secondary amino=80%.

Production Example 4

Showamine X (bifunctional, amine equivalent 68, molecular weight 136) and 2-ethylhexyl acrylate were reacted in an equivalent ratio of 1:1 at 80° C. for 14 hours to give a modified polyamine C. Rate of conversion to secondary amino=87%.

EXAMPLE 1

42 parts of Texrim TR-5050 (trifunctional, amine equivalents 1930, average MW 5000), 21 parts of modified polyamine C of Production Example 4, 37 parts of Ethacure 100 and 1 parts of the polyoxyalkylene glycol monobutyl ether of Production Example 1 were blended. The resulting mixture and a mixture of 59 parts of Millionate MTL and 24 parts of Coronate HX were impingingly injected, by the double jet method, into a mold previously given a uniform coating of an external mold release B-269 (Chukyo Yushi) under the following conditions.

Mold: 400 mm×300 mm×3 mm (thick)

Temperature of charge: 45±2° C.

Injection pressure: 150±20 kg/cm$^2$

Injection rate: ca. 420 cc/sec

Mold temperature: 70±2° C.

After a retention time of 20 seconds, the molding was taken out and the mold releaseability was evaluated according to the criteria described below. Then the molding was subjected to the post curing step at 120° C. for 30 minutes, coated with a polyurethane primer and the coatability was evaluated according to the criteria described below. The results are shown in Table 1.

EXAMPLE 2–3

Comparative Example 1

Using the formulations shown in Table 1, RIM was carried out under the same conditions as in Example 1 and the resulting moldings were tested for mold releaseability and coatability. The results are shown in Table 1.

Evaluation Criteria

1. Mold releaseability

The mold was uniformly coated with an external mold release B-269 (Chukyo Yushi) prior to the test and the maximum number of repeated molding and demolding cycles before sticking or generation of cracks began to occur with a single application of the external mold release was recorded.

2. Coatability

After subjecting to the post curing at 120° C. for 30 minutes, the molding was cooled to room temperature, wiped with toluene, coated with a polyurethane primer RB-230 (Nippon P Chemical) and baked at an elevated temperature. The adhesion of the coating film to the substrate was evaluated by the grid pattern scratch-pressure sensitive adhesive tape method according to JIS K 5400 (8.5.2).

TABLE 1

| | Example | | | Comp. Example |
|---|---|---|---|---|
| Component (part) | 1 | 2 | 3 | 1 |
| Texrim TR-5050 | 42 | — | 40 | 42 |
| Modified polyamine A | — | 62 | — | — |
| Modified polyamine B | 21 | 13 | 20 | 21 |
| Ethacure 100 | 37 | 25 | 30 | 37 |
| Modified polyamine C | — | — | 10 | — |
| nBuEOPO | 1 | 1 | 1 | — |
| Zinc stearate | — | — | — | 1 |
| Millionate MTL | 59 | 56 | 55 | 59 |
| Coromate HX | 24 | — | 23 | 24 |
| Mold releaseability | 40 | 20 | 20 | 19 |
| Coatability | 10 | 10 | 10 | 6 |

Production Example 5

A separable flask equipped with a stirrer, a condenser and a nitrogen tube was charged with SR-TPG (bifunctional polyether polyepoxide, epoxy equivalent 200) and 534 parts of Ethacure 100 (amine equivalent 89). Then the mixture was heated at 90° C. for 5 hours under the nitrogen gas current with stirring.

Production Example 6

The same flask as used in Production Example 5 was charged with Denacol EX 931 (bifunctional polyether polyepoxide, epoxy equivalent 528), 118.8 parts of MDA-220 (amine equivalent 99) and 320.4 parts of Ethacure. Then the mixture was heated at 100° C. for 6 hours under the nitrogen gas current with stirring.

Production Example 7

The same flask as used in Production Example 5 was charged with 77.5 parts of Denacol EX 421 (trifunctional polyether polyepoxide, epoxy equivalent 155) and 712 parts of Ethacure 100. Then the mixture was heated at 110° C. for 6 hours under the nitrogen gas current with stirring.

Production Example 8

The same flask as used in Production Example 5 was charged with 495 parts of Denacol EX-2000 (bifunctional aromatic polyether polyepoxide, epoxy equivalent 1100) and 320.4 parts of Ethacure 100. Then the mixture was heated at 140° C. for 3 hours under the nitrogen gas current with stirring.

EXAMPLE 4

30 parts of Jeffamine D-2000, 15 parts of Texrim TR-5050, 21 parts of Ethacure 100, 15 parts of modified polyamine B of Production Example 3 and 19 parts of the product of Production Example 5 were blended. The resulting mixture and a mixture of 80 parts of MDI prepolymer and 15 parts of HMDI prepolymer were impingingly injected, by a double jet method, into a mold.

Mold: 400 mm×300 mm×3 mm (thick)

Temperature of charge: 45±2° C.

Injection pressure: 150±20 kg/cm$^2$

Injection rate: ca. 420 cc/sec

Mold temperature: 70±2° C.

After a retention time of 20 seconds, the molding was subjected to post curing at 120° C. for 30 minutes to give a RIM product. This product was evaluated according to the criteria described below. The results are shown in Table 2.

EXAMPLES 5–7

Comparative Examples 2–3

Using the formulations shown in Table 2, RIM was carried out under the same conditions as in Example 4 and the resulting products were evaluated as in Example 4.

Evaluation Criteria

1. Moldability

The mold filling performance of each composition was evaluated.

Good: retained sufficient flowability for 1.5 second after the beginning of filling.

Not good: lost flowability to interfere with mold filling within 1.5 seconds.

2. Deformation upon mold release

Good: molding as ejected retained the configuration conforming to the mold cavity without perment plastic deformation.

Not good: molding as ejected was lost the configuration conforming to the mold cavity owing to permanent deformation.

3. Strength of flash

Good: flashes were fully removed with the molding from the mold.

Not good: flashes were torn off and remained in the mold.

4. Stress/strain characteristics

According to the method of ASTM D 638, a specimen cut out from the molding was tested for stress/strain characteristics at a pulling velocity of 5 mm/min.

TABLE 2

| Component (parts) | Example 4 | Example 5 | Example 6 | Example 7 | Comp. Example 2 | Comp. Example 3 |
|---|---|---|---|---|---|---|
| Product of Pro. Ex. 5 | 19.0 | — | — | 19.0 | — | — |
| Product of Pro. Ex. 6 | — | — | 34.0 | — | — | — |
| Product of Pro. Ex. 7 | — | 20.0 | — | — | — | 25.0 |
| Product of Pro. Ex. 8 | — | 25.0 | — | — | — | 40.0 |
| Jeffamine D-2000 | 30.0 | 20.0 | 30.0 | 30.0 | 25.0 | 35.0 |
| Texrim TR-5050 | 15.0 | 9.0 | — | 15.0 | 20.0 | — |
| Ethacure 100 | 21.0 | 14.0 | 20.0 | 21.0 | 35.0 | — |
| Modified polyamine B | 15.0 | 12.0 | 16.0 | — | 20.0 | — |
| Modified polyamine C | — | — | — | 15.0 | — | — |
| MDI prepolymer | 80.0 | 89.0 | 86.0 | 86.0 | 86.0 | 76.0 |
| HMDI prepolymer | 15.0 | 17.0 | 17.0 | 17.0 | 17.0 | 15.0 |
| Secondary amine content (%) | 7.7 | 5.8 | 7.9 | 7.4 | 9.0 | — |
| Moldability | Good | Good | Good | Good | Good | Not good |
| Deformation upon mold release | Good | Good | Good | Good | Not good | Not good |
| Strength of flash | Good | Good | Good | Good | Good | Not good |
| Tensile strength (MPa) | 16 | 25 | 23 | 28 | 15 | 16 |
| Elongation at break (%) | 67 | 52 | 58 | 48 | 35 | 15 |

We claim:

1. In a moldable polyurea resin composition comprising:
    (a) a polyoxyalkylene polyamine;
    (b) an aromatic polyamine and/or xylylenediamine;
        at least one of said polyoxyalkylene polyamine (a) and said aromatic polyamine and/or xylylenediamine (b) having been modified either wholly or partly to have a plurality of secondary amino groups by a Michael reaction of the primary amino group thereof with an unsaturated compound of the formula $CH_2=C(R)-Y$, wherein R is a hydrogen atom or a methyl group and Y is an electron attracting group; and
    (c) a polyisocyanate compound; the improvement wherein the polyurea resin composition further contains at least 0.5% but less than 5.0% by weight of a polyoxyalkylene mono-$C_4$-$C_{18}$ alkyl ether having a weigh average molecular weight from 800 to 10,000 to enhance the initial strength and mold release characteristic of articles molded therefrom,
    and wherein the polyoxyalkylene chain of the polyoxyalkylene mono-$C_4$-$C_{18}$ alkyl ether contains from 30 to 80 mole % of ethylene oxide units and the balance propylene oxide units in a random or block copolymer form.

2. A polyurea resin composition of claim 1 wherein said polyoxyalkylene monoalkyl ether has a weight average molecular weight from 1,000 to 6,000.

3. A polyurea resin composition according to claim 1 wherein said amount of polyoxyalkylene mono-$C_4$-$C_{18}$ alkyl ether is from 0.5 to 2% by weight based on the entire composition.

4. A polyurea resin composition according to claim 1 wherein the proportion of said modified polyamine is greater than 5% by weight of the entire composition.

5. A polyurea resin composition according to claim 1 wherein the electron attracting group Y of said unsaturated compound is a carboxylic ester residue, a ketone residue, cyano, an unsubstituted or lower alkyl-substituted amide residue, a sulfone residue or a sulfonic ester residue.

6. A polyurea resin composition according to claim 1 wherein said unsaturated compound is an alkyl acrylate monomer.

7. A polyurea resin composition according to claim 1 wherein the molar ratio of all amino groups in said polyamine components to isocyanate groups in said polyisocyanate component is 1:0.7 through 1:1.5.

8. A polyurea resin composition according to claim 1 further comprising a reaction product of a polyglycidyl ether and a primary aromatic amine.

9. A polyurea resin composition according to claim 8 wherein the molar ratio of the primary amino group in said primary aromatic polyamine to glycidyl group in said polyglycidyl ether is equal to or greater than 2.

10. A polyurea resin composition according to claim 8 wherein said polyglycidyl ether is a polyphenol polyglycidyl ether, a polyglycerine polyglycidyl ether or a polyoxyalkylenepolyol polyglycidyl ether.

11. A polyurea resin composition according to claim 8 wherein said polyglycidyl ether has an average molecular weight less than that of either said polyoxyalkylenepolyamine (a) or said aromatic polyamine and/or xylylenediamine (b) whichever has the greatest weight average molecular weight.

12. A polyurea resin composition according to claim 8 wherein said primary aromatic polyamine is tolylenediamine.

13. A polyurea resin composition according to claim 8 wherein the proportion of said reaction product is from 2 to 40% by weight of the entire composition.

* * * * *